US011958735B2

(12) United States Patent
Blayle

(10) Patent No.: US 11,958,735 B2
(45) Date of Patent: Apr. 16, 2024

(54) SYSTEMS AND METHODS FOR DISPENSING LIQUID THROUGH A PORTION OF AN ICE STORAGE BIN AND RELATED CLEANING PROCESSES

(71) Applicant: Follett Products, LLC, Easton, PA (US)

(72) Inventor: Paul William Blayle, Allentown, PA (US)

(73) Assignee: FOLLETT PRODUCTS, LLC, Easton, PA (US)

(*) Notice: Subject to any disclaimer, the term of this patent is extended or adjusted under 35 U.S.C. 154(b) by 0 days.

(21) Appl. No.: 17/748,659

(22) Filed: May 19, 2022

(65) Prior Publication Data

US 2022/0380191 A1 Dec. 1, 2022

Related U.S. Application Data

(60) Provisional application No. 63/193,696, filed on May 27, 2021.

(51) Int. Cl.

| | |
|---|---|
| ***F25C 5/20*** | (2018.01) |
| ***B08B 9/08*** | (2006.01) |
| ***B67D 1/00*** | (2006.01) |
| ***B67D 1/07*** | (2006.01) |

(52) U.S. Cl.

CPC .............. *B67D 1/0003* (2013.01); *B08B 9/08* (2013.01); *B67D 1/07* (2013.01); *F25C 5/20* (2018.01); *B67D 2001/075* (2013.01); *F25C 2400/12* (2013.01); *F25C 2400/14* (2013.01)

(58) Field of Classification Search

CPC .......... F25C 2400/12; F25C 5/24; F25C 5/18; F25C 5/20; F25C 5/22; B67D 1/0003; B67D 2001/075; B67D 1/0065; B67D 1/07; B08B 9/08; A23G 9/30

See application file for complete search history.

(56) References Cited

U.S. PATENT DOCUMENTS

| | | | |
|---|---|---|---|
| 4,946,073 | A | 8/1990 | Brill et al. |
| 5,289,691 | A | 3/1994 | Schlosser et al. |
| 6,334,328 | B1 | 1/2002 | Brill |
| 6,619,051 | B1 | 9/2003 | Kilawee et al. |
| 7,263,844 | B2 | 9/2007 | Brunner et al. |
| 7,757,500 | B2 | 7/2010 | Hawkes et al. |
| 8,756,950 | B2 | 6/2014 | Brunner et al. |
| 8,893,926 | B2 | 11/2014 | Anderson et al. |
| 9,885,511 | B2 | 2/2018 | Brunner et al. |
| 10,174,984 | B2 | 1/2019 | Vorosmarti, III et al. |
| 10,288,336 | B2 | 5/2019 | Kessler et al. |
| 10,317,122 | B2 | 6/2019 | Broadbent et al. |

(Continued)

*Primary Examiner* — Cassey D Bauer

(74) *Attorney, Agent, or Firm* — Crowell & Moring LLP

(57) ABSTRACT

Systems and methods are provided for dispensing ice and at least one liquid, and related cleaning processes. In one embodiment, the system comprises an ice bin for storing a quantity of ice particles, a dispensing tube for carrying at least a first liquid, and a discharge chute in communication with a discharge outlet, wherein the discharge chute is disposed upstream of the discharge outlet. An outlet end of the dispensing tube is positioned within a portion of the ice bin at a location aligned above the discharge outlet. The ice particles and the first liquid are dispensed through the discharge outlet separately or at the same time.

17 Claims, 7 Drawing Sheets

(56) References Cited

U.S. PATENT DOCUMENTS

| | | | | |
|---|---|---|---|---|
| 2015/0306640 | A1 * | 10/2015 | Lazzarini | B08B 9/08 134/18 |
| 2016/0081365 | A1 | 3/2016 | Bertone | |

* cited by examiner

SYSTEMS AND METHODS FOR DISPENSING LIQUID THROUGH A PORTION OF AN ICE STORAGE BIN AND RELATED CLEANING PROCESSES

PRIORITY CLAIM

This invention claims the benefit of priority of U.S. Provisional Application Ser. No. 63/193,696, entitled "Systems and Methods for Dispensing Liquid Through a Portion of an Ice Storage Bin and Related Cleaning Processes," filed May 27, 2021, the disclosure of which is hereby incorporated by reference in its entirety.

BACKGROUND

The present embodiments relate generally to systems and methods for improved dispensing of liquid, including but not limited to water, through a portion of an ice storage bin, and related cleaning and sanitizing processes.

Ice and water dispensers are commercially available for home and office use. Commercial ice and water dispensers utilize potable water, typically supplied from a water supply of a building.

Drinking water has an amount of naturally occurring mineral and biological contaminants. The biological contaminants will tend to create microscopic biofilms on the surfaces of which they are in contact. These microscopic biofilms require regular cleaning that is typically performed by mechanical scrubbing and/or chemical sanitizer introduction to inactivate or alleviate any such contaminants.

The mineral content, both particulate and dissolved ions, may include by way of example and without limitation, calcium, magnesium, chloride, carbonate, and bicarbonate. Such content tends to accumulate in ice makers, ice storage containers, and ice and water dispensing components either as precipitated sludge or plated scale. Precipitate sludges tend to build in areas where water flow is relatively stagnant. Scale plates on heat exchanging surfaces and on areas that regularly become wet and allowed to air dry where the water evaporates and leaves the minerals behind. These minerals require regular cleaning by flushing areas of stagnant water and descaling of scale plated surfaces with chemical cleaning agents. The chemical descaling, cleaning, and sanitizing can be performed in separate steps or combined into a single step.

A typical cleaning procedure focuses on the ice making and storage portion of an ice and water dispenser. Additional cleaning, descaling or sanitizing of the discharge chute and outlet that dispenses ice and liquid to a user is either out of scope of the manufacturer's cleaning and sanitizing procedures or it is accomplished by additional steps to clean, descale and sanitize the ice and liquid discharge regions.

SUMMARY

Systems and methods are provided for dispensing ice and at least one liquid, and related cleaning processes. In one embodiment, the system comprises an ice bin for storing a quantity of ice particles, a dispensing tube for carrying at least a first liquid, and a discharge chute in communication with a discharge outlet, wherein the discharge chute is disposed upstream of the discharge outlet. An outlet end of the dispensing tube is positioned within a portion of the ice bin at a location aligned above the discharge outlet. The ice particles and the first liquid are dispensed through the discharge outlet separately or at the same time.

In another embodiment, the system comprises an ice bin for storing a quantity of ice particles, a dispensing tube for carrying at least a first liquid, and a discharge chute in communication with a discharge outlet, wherein the discharge chute is disposed upstream of the discharge outlet. The dispensing tube is operative to dispense the first liquid through the discharge outlet for drinking by a user in a first operative state. Further, the dispensing tube is operative to dispense the first liquid into the discharge chute in a second operative state during a cleaning operation, wherein the cleaning operation simultaneously cleans at least the discharge chute and the ice bin.

In one embodiment, a method for cleaning a system capable of dispensing ice and at least one liquid is provided, including introducing a cleaning or sanitizing solution into an ice bin through a first opening in the ice bin, and introducing a first liquid through a dispensing tube that is positioned at a second opening separate from the first opening in the ice bin. Upon introduction through the first opening, the cleaning or sanitizing solution flows into an ice bin storage area and also flows into a discharge chute that dispenses ice and liquid to a user. Further, upon introduction through the second opening, the first liquid flows into the discharge chute and also flows into the ice bin storage area, such that at least the discharge chute and the ice bin storage area are cleaned simultaneously.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 2:
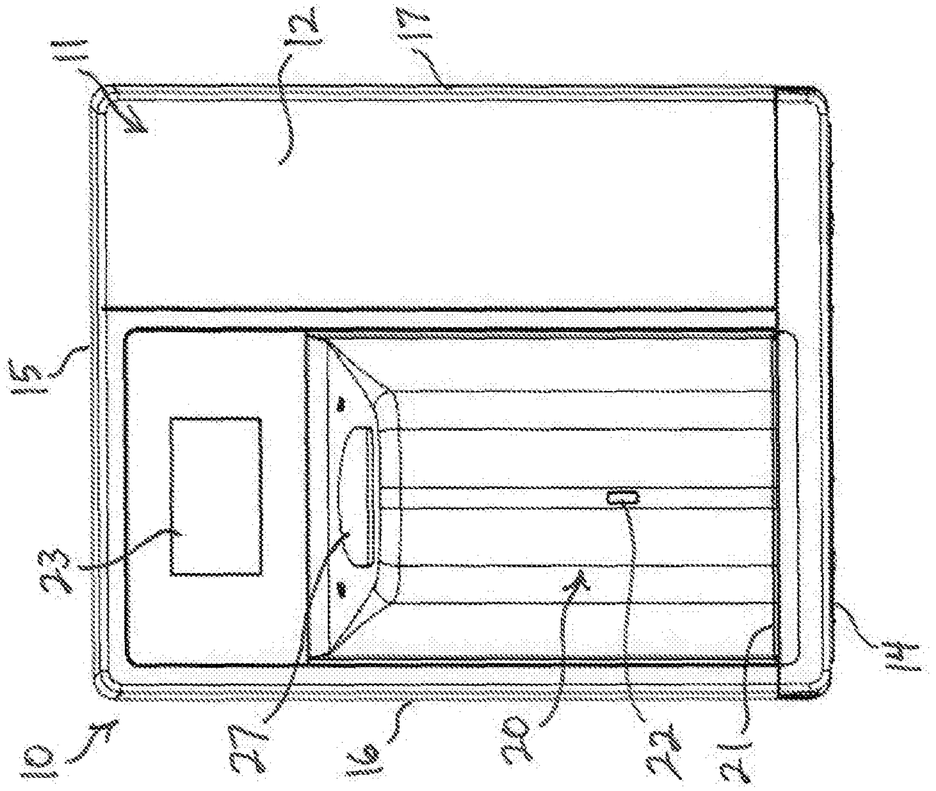
FIG. 2 is a front view of the system of FIG. 1.
Figure 1:
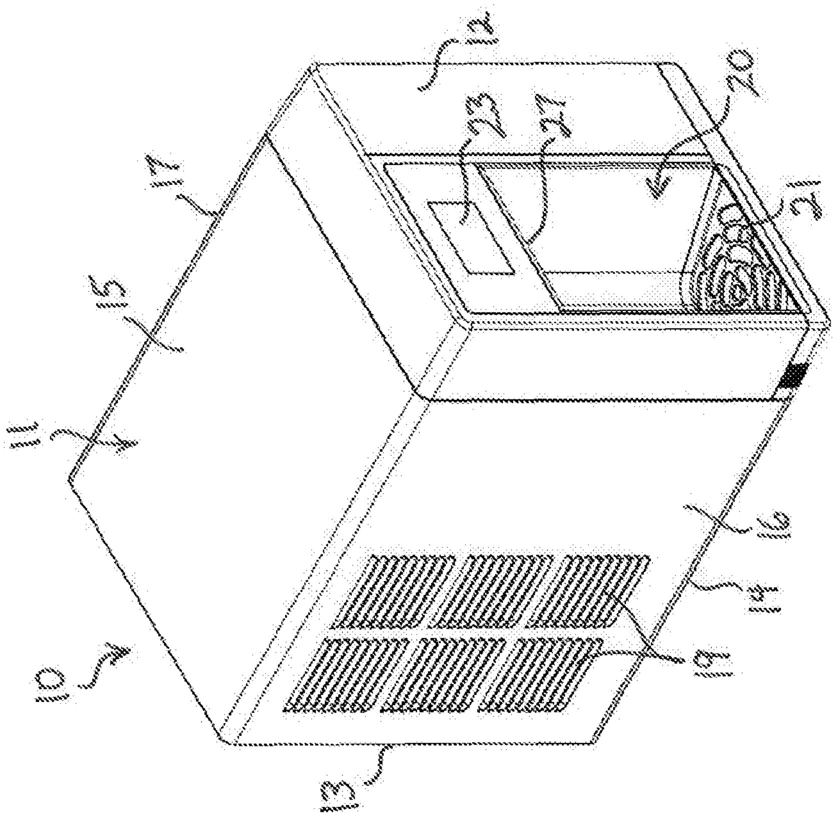
FIG. 1 is a perspective view of a first embodiment of a system for dispensing ice and at least one liquid.

Referring to FIGS. 1-2, a first embodiment of a system 10 for dispensing ice and liquid is shown and described. The system 10 is shown in an assembled state in FIGS. 1-2, and comprises a housing 11, front and rear regions 12 and 13, respectively, lower and upper surfaces 14 and 15, respectively, and opposing side surfaces 16 and 17.

The system 10 may be dimensioned to be used in any setting, including but not limited to a home or office environment. In one non-limiting example, the system 10 comprises a height of between about 16 and 20 inches, and may be placed on a countertop or other location in a suitable environment with user access to the front region 12 of the system.

The system 10 is capable of ice making and ice storage, in addition to dispensing one or more liquids, as will be explained in greater detail below. In some embodiments, the system 10 may produce about 4 to 5 pounds of ice per hour, and store about 7 to 8 pounds of ice in its internal storage bin. As will be appreciated, the dimensions of the system 10, and its ice making and storage capabilities, may be modified to accommodate different environments and user needs, while still being provided in accordance with the principles described further below.

In one embodiment, the front region 12 of the system 10 comprises a placement zone 20, where a user can place a cup or other container that receives ice and/or liquid, as instructed by the user. The placement zone 20 may be recessed rearward relative to a remainder of the front region 12 of the system 10, and may occupy a space between the lower surface 14 of the system 10 and a discharge outlet 27, as depicted in FIGS. 1-2.

In some embodiments, a tray 21 may be disposed near the lower end of the system 10, e.g., slightly above the lower surface 14 as illustrated in FIGS. 1-2. The tray 21 may accommodate a cup or other container thereon, and may be adapted to receive and hold overflow liquid and/or ice therein. The tray 21 may be provided with a perforate grate at its upper end, upon which a cup or other container would be placed to receive liquid and/or ice dispensed therein.

The system 10 may be configured to accommodate cups or other containers that are about 8 inches or more high, and therefore in some embodiments the distance between an upper surface of the tray 21 and a lower surface of the discharge outlet 27 is greater than 8 inches.

In accordance with one aspect, both ice and liquid are dispensed through the discharge outlet 27, thereby avoiding the need to have a first outlet for ice and a second outlet for liquid, where the first and second outlets are spaced apart. In this manner, the system 10 provides the user with an advantage of being able to locate the cup at a single placement zone 20 for both ice and liquid, without having to move the cup among locations if both are desired. Further, space savings may be achieved, particularly between the opposing side surfaces 16 and 17 of the system 10, by having a single placement location for ice and liquid, as opposed to two locations spaced apart, thereby allowing the system 10 to be placed in a greater range of environments.

Referring to FIG. 2, the system 10 may further comprise at least one sensor 22, which may be configured to sense placement of the cup in the placement zone 20. The system 10 may be configured such that ice and liquid may not be dispensed if the sensor 22 fails to detect a cup placement in the zone 20, or the sensor 22 may provide feedback to a processor such as motion detection and the like.

At least one electrical connection (not shown) in the form of a plug may be provided for connection to an electrical outlet for supplying power to the system 10. Vents 19 are depicted in the side surface 16 of the system 10 for accommodating the dissipation of heat generated by a refrigeration cycle that exists inside the housing 11, especially from a condenser unit contained therein.

Figure 3:
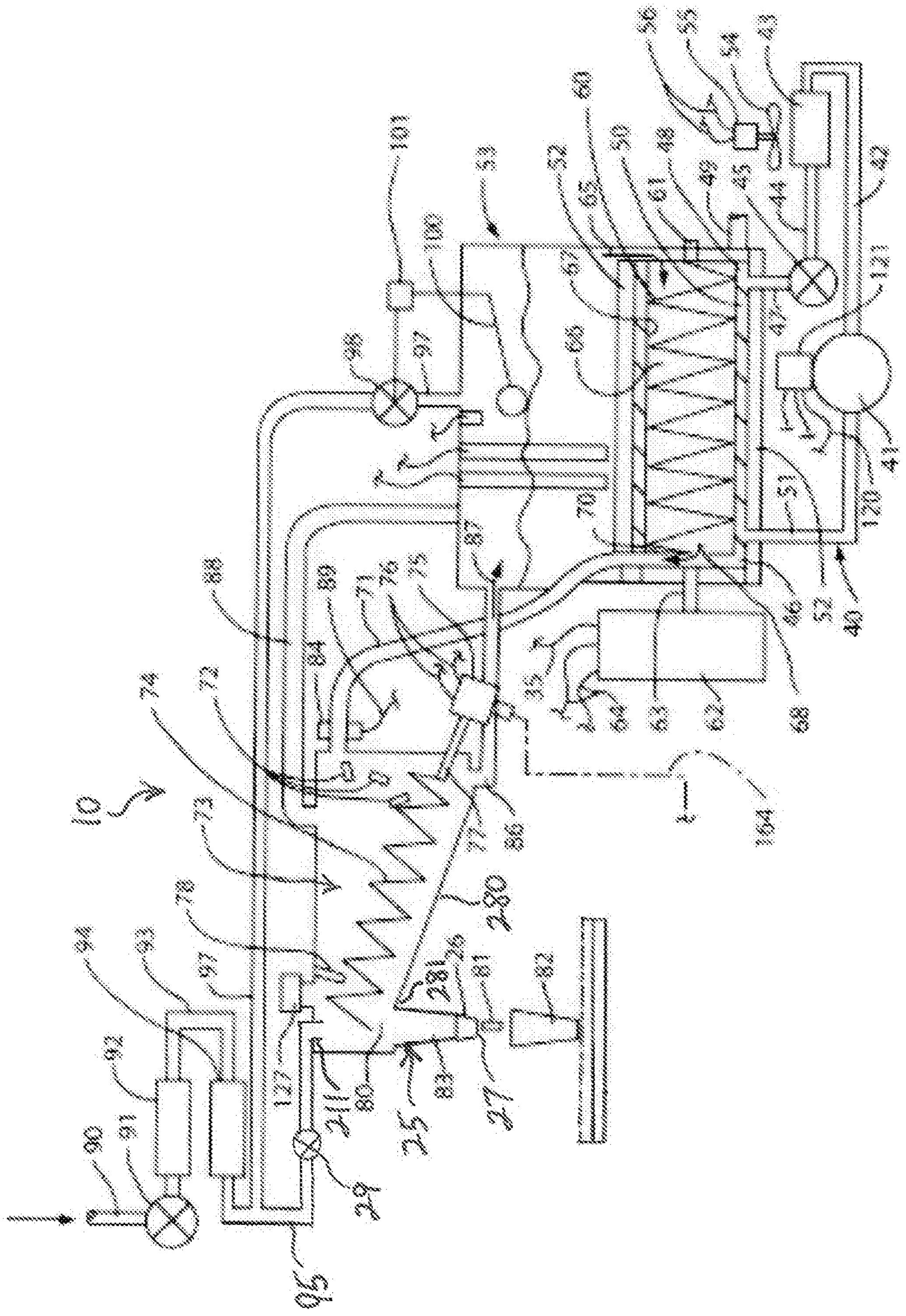
FIG. 3 is a side schematic view of the system of FIGS. 1-2, including components of an ice storage bin and a refrigeration cycle.

Referring now to FIG. 3, select functional characteristics of the system 10 are shown and described. At the lower right portion of the schematic of FIG. 3, a refrigeration cycle is generally indicated at 40, as including a compressor 41, for compressing a refrigerant vapor, such as Freon or the like, which is delivered via a refrigerant line 42 to a condenser 43, where heat is dissipated from the condenser, and with the refrigerant fluid then passing via refrigerant line 44 to and through an expansion device 45, where it is changed into a gaseous state for delivery to an evaporator 46 via a refrigerant line 47. The evaporator 46 has an inner cylindrical wall 48 that comprises the evaporator body, along with a generally spiral flight 50 carried by the metal, preferably steel evaporator body 48, on the outer diameter of the evaporator body 48, with the spiral flight creating a canal along which the refrigerant flows from the refrigerant inlet line 47 to the refrigerant vapor line 51 at the outlet of the evaporator 46, for return of refrigerant vapor back to the compressor 41.

The cylindrical jacket 52 for the evaporator 46 is comprised of a preferably plastic material, which is a component of a water reservoir 53. Features of a suitable water reservoir 53, which may be used in conjunction with the present system 10, are described in further detail in U.S. Pat. No. 8,756,950 (hereafter "the '950 patent"), which is hereby incorporated by reference in its entirety. At right and left ends of the evaporator 46, suitable sealing means are provided, such as O-rings (not shown), for sealing the refrigerant flowing in the canal provided by the helical flight, to prevent leakage of refrigerant fluid from the evaporator at right and left ends. A suitable fan 54 will preferably be provided, motor driven at location 55 from a suitable electrical source 56, for facilitating the dissipation of heat from the condenser 43.

An auger 60 is located inside the evaporator 46, being shaft mounted at location 61 on its right end as shown in FIG. 3, and being driven by a gearmotor 62 at its left end as shown, for rotatingly driving the auger shaft 63. The gearmotor 62 is suitably driven by electric power from wires 64, as shown.

During rotation of the auger 60, water provided from the water reservoir 53, via an opening at the right end of the evaporator 46, as shown, enters the freezing zone 66, to form as ice on the wall 67 of the evaporator 46, to be scraped therefrom by the auger 60, and delivered leftward along the auger 60, to be compacted as an elongate cylinder of ice as ice leaves the left end 68 of the evaporator body in the direction of arrow 70 into an ice conduit 71 for delivery as individual ice particles 72 into an ice bin 73.

It should be noted that "ice particles" may encompass, by way of example and without limitation, nuggets, cubes or other types of ice pieces regardless of shape and size, their manner of formation, or their original location. The refrigeration cycle 40 is one example of a system that may produce ice particles of an exemplary size and shape, but other ice particles may be produced, provided, used or otherwise dispensed in accordance with the principles herein.

In the ice bin 73, a wire screw type auger 74 is disposed, at an acute angle, as illustrated in FIG. 3 and described further below, and is driven via a motor 75 suitably electrically connected at location 76 for driving a shaft 77 that drives the wire auger 74.

Ice particles 72 that have accumulated at the lower end of the ice bin 73 are thus delivered via the wire auger 74 from a lower end of the bin, towards an upper end of the bin, where they may be metered via an ice particle baffle 78, to a location 80 from where they can be discharged through the discharge outlet 27, upon a user instructing the discharge of ice particles therethrough, such as by using a touch screen interface 23 operative to send a signal to the motor 75 to drive the auger 74.

At that time, discharged ice particles 81 may fall into a cup or other container 82 therebeneath, as explained further below. It will be understood that as the auger 74 advances ice particles towards and over a highest location 281 of an angled wall 280 of the ice bin 73, gravity can cause the ice to then drop through a discharge chute 25, for discharge of ice 81 through the discharge outlet 27, as will be explained in further detail below.

If desired, the flow of ice via line 71 into the bin 73 may be interrupted in the event that the bin 73 becomes full of ice, by having a suitable ice fill controller 84 disposed in the line 71, which can be electrically connected via line 120 to compressor 41 to shut down the compressor 41, and at location 89 to the gearmotor 62 to discontinue operation of the gearmotor 62 that drives the ice scraping auger 60, until some of the ice particles 72 are emptied from the bin 73, in which case, the controller 84 can re-open the line 71 and re-actuate the gearmotor 62 and compressor 41, to resume filling the bin 73 with ice particles. The controller 84 can, if desired, operate to sense axial strain in the conduit 71 as is disclosed in U.S. Pat. No. 7,469,548, the disclosure of which is hereby incorporated by reference in its entirety.

In the event that ice particles in the bin 73 begin to melt, and melt water is present at the lower end of the bin 73, such melt water can drain by entering a water drain line 86, to pass into the water reservoir 53 via the drain line 86, by means of gravity flow thereto, in the direction of arrow 87.

A vent line 88 may be provided between the ice storage bin 73 and the water reservoir 53, as shown in FIG. 3, such that the ice storage bin 73, the water reservoir 53, the zone 66 for ice formation within the evaporator 46, the drain line 86, and the ice delivery conduit 71 comprise a closed system (except for the discharge outlet 27), sealed closed to atmosphere, remaining clean and uncontaminated from ambient influences.

Figure 6:
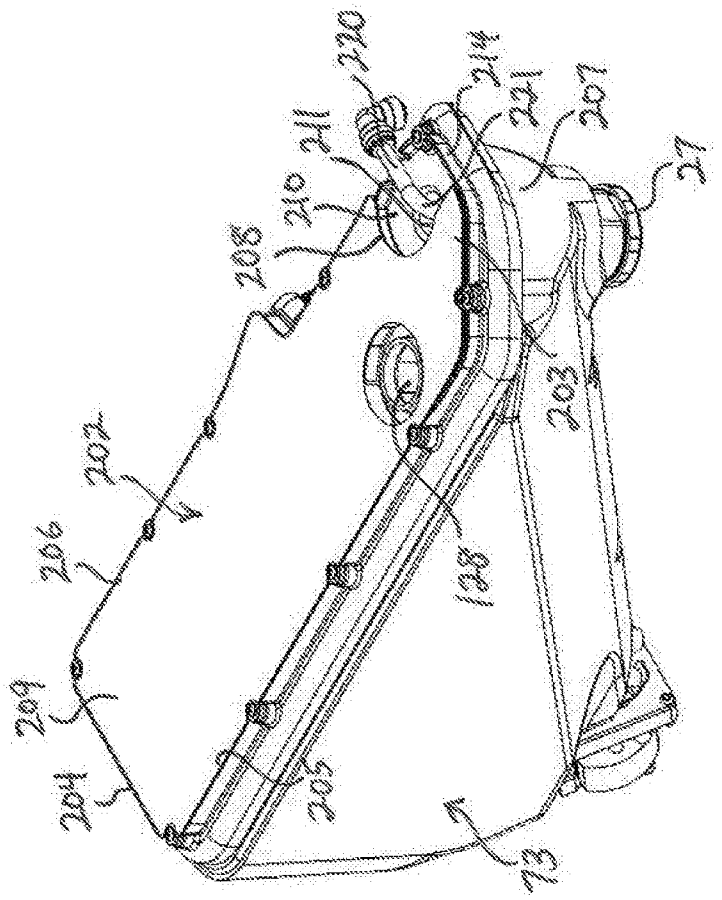
FIG. 6 is a perspective view illustrating features of the ice bin and associated components from a different angle than FIG. 5.

Referring still to FIG. 3, water is delivered to the system 10 from a house, office or commercial water supply line 90, through a valve 91 that controls water flow, through an optional ultraviolet treatment station 92 where ultraviolet light can neutralize any bacteria in the water, with the water then passing via water line 93 to an optional filter 94, to a water delivery line 95, then towards the ice bin 73, as depicted in FIG. 3. As explained in further detail below in FIGS. 4-10, water may flow past a valve 29 and enter into the ice bin 73 via an opening 211 disposed in an upper surface of the ice bin 73, e.g., as depicted in FIGS. 5-6. Water entering through the upper surface of the ice bin 73 at opening 211 may be dispensed into the user's cup 82 via the same outlet 27 that dispenses ice 81, thereby allowing a user to obtain ice and water at the same cup placement location, as will be explained further below.

Inlet water is also thereby delivered via line 97 to the water reservoir 53, via a valve 98 that is controlled by means of a float 100 operated in accordance with the water level within the water reservoir 53, to allow more water to enter the reservoir 53 via control device 101 that opens and closes the valve 98, as explained further in the '950 patent.

Figure 4:
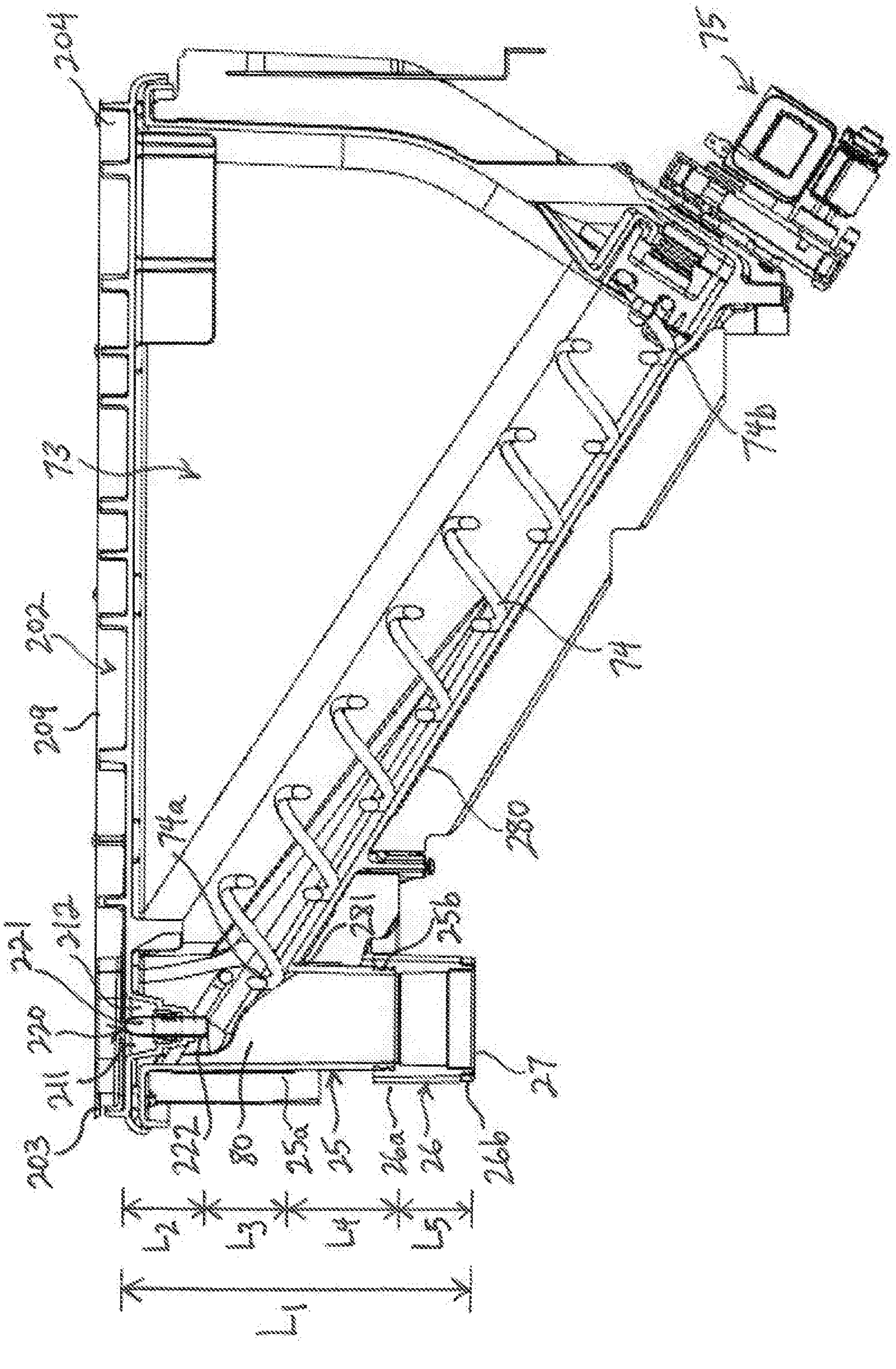
FIG. 4 is a side sectional view illustrating features of the ice bin and associated components of the system of FIGS. 1-3.
Figure 5:
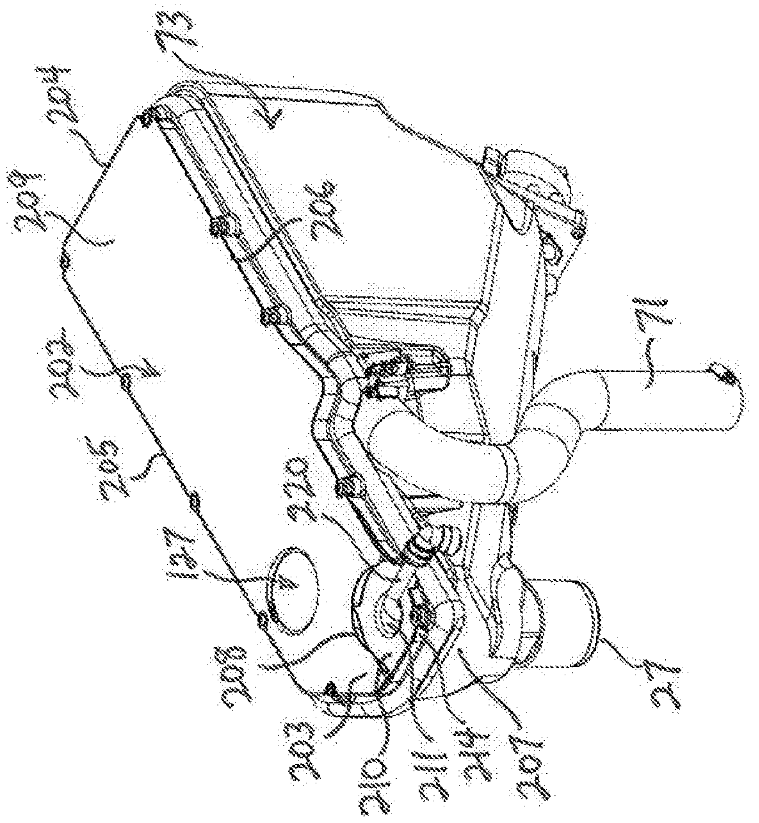
FIG. 5 is a perspective view illustrating features of the ice bin and associated components of the system of FIGS. 1-4.

Referring now to FIGS. 4-6, additional features of components in and around ice bin 73 are described in further detail, where the ice bin 73 is shown generally isolated from the system 10 and the main housing 11, to better depict features related to the ice bin 73. The ice bin 73 comprises a lid 202 having a forward region 203 that is positioned closer to an elevated first end **74*a* of the auger 74, and the lid 202 further comprises a rearward region 204 that is disposed closer to a lower second end 74*b* of the auger 74, as seen in FIGS. 4-6. Additionally, the ice bin lid 202 comprises opposing side surfaces 205 and 206, as depicted in FIGS. 5-6, which extend between the forward and rearward regions 203 and 204**.

In one embodiment, at least one of the forward region 203 and the side surface 206 of the lid 202 may comprise a cutout 208, which allows receipt of at least one dispensing tube 220, as depicted in FIGS. 5-6. In the example of FIGS. 5-6, the cutout 208 is disposed in a corner of the lid 202 such that the cutout extends into both the forward region 203 and the side surface 206 of the lid 202, although it will be appreciated that in alternative embodiments the cutout 208 may be disposed in only one of the forward region 203 or the side surface 206, or alternatively may be a cutout spaced inward from any side surface of the lid 202, i.e., does not extend into a side border of the lid 202. However, by providing the cutout 208 in a forward and/or side surface, a height profile of the system 10 may advantageously be reduced as the dispensing tube 220 may be recessed at a lower height relative to the lid 202. In such scenario, the dispensing tube 220 may not extend above an upper surface 209 of the lid 202 (or may project only a slight distance above the upper surface 209 but be predominantly recessed below the upper surface 209), as shown in FIGS. 5-8.

Figure 7:
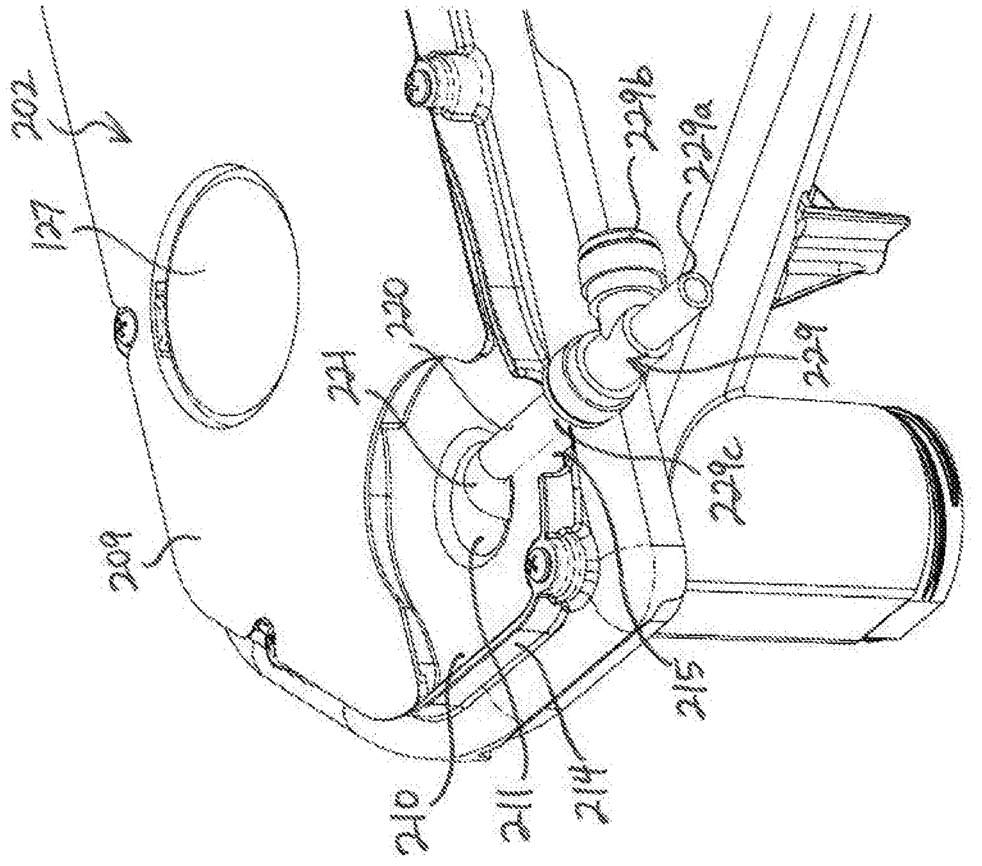
FIG. 7 is a perspective view illustrating features of the ice bin and associated components from a different and enlarged view than FIGS. 5-6.
Figure 8:
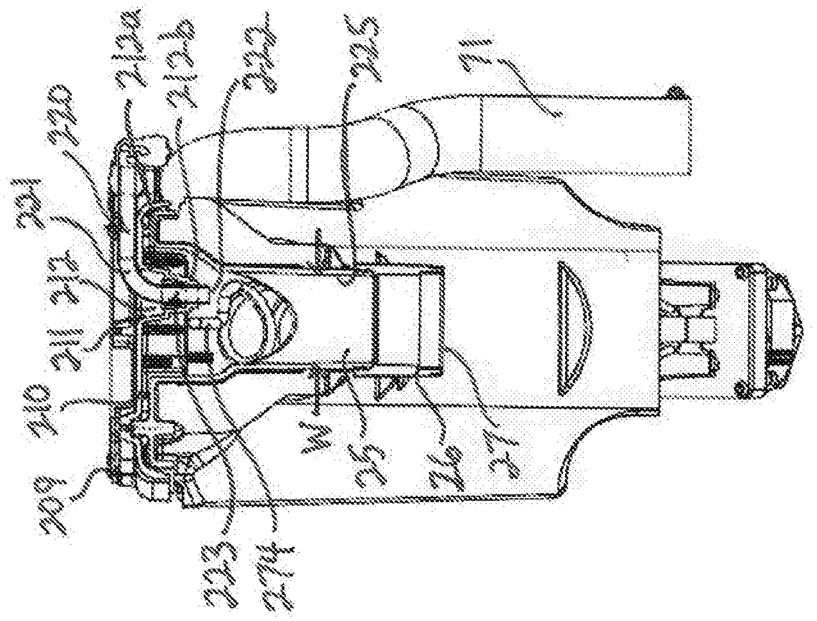
FIG. 8 is a front and partially cutaway view illustrating features of the ice bin and associated components of the system of FIGS. 1-7.

The lid 202 may rest upon a portion of a ledge 210, as best seen in FIGS. 5-8. The ledge 210 may comprise an opening 211 having a recess 212 (best seen in FIG. 8) through which the dispensing tube 220 extends. In one embodiment, shown in FIG. 8, the recess 212 may comprise an upper region **212*a* having a first width, and a lower region 212*b* having a second width, where the first width is greater than the second width. The dispensing tube 220 may comprise a fitting 223 that is secured at or adjacent to the lower region 212*b* of the recess 212, as depicted in FIG. 8. In one example, the fitting 223 may employ a threaded engagement (e.g., the fitting 223 may have exterior threading that engages interior threading of the recess 212), or the fitting 223 may be secured relative to the recess 212 using a snap-fit connection, frictional engagement, or other techniques. In this manner, an end region of the dispensing tube 220 may be secured relative to the ledge 210 upon which the lid 202** rests.

As shown in FIGS. 5-7, a raised perimeter 214 may extend upward from at least a portion of the ledge 210. One or more of the outer regions 203 through 206 of the lid 202 may snugly engage an interior surface of the raised perimeter 214, such that the lid 202 is substantially flush with the raised perimeter 214 when resting upon the ledge 210, as best seen in FIG. 7. In one embodiment, the raised perimeter 214 may comprise a cutout 215 through which the dispensing tube 220 may extend to avoid an increase in profile of the system 10 as the dispensing tube 220 approaches the opening 211 into the recess 212, as depicted in FIG. 7.

The dispensing tube 220 may comprise a curved segment 221, which as depicted in FIGS. 4-8 may adjust the orientation of the dispensing tube 220 from a substantially horizontal orientation adjacent to the ledge 210 or lid 202, to a substantially vertical orientation aligned with a main vertical axis of discharge chute 25. In one embodiment, the curved segment 221 has an angle of approximately 90 degrees, although it will be appreciated that in other embodiments the curvature of segment 221 may be varied in the event that an upstream portion of the dispensing tube 220 is at a different angle, e.g., if the cutout 215 of FIG. 7 is omitted such that the upstream portion of dispensing tube 220 is not horizontal relative to the ledge 210 or lid 202. Moreover, it will be appreciated that the curved segment 221 may be integrally formed with the upstream portion of the dispensing tube 220, or may comprise an external connector secured to the upstream portion of the dispensing tube 220.

In accordance with one aspect, the dispensing tube 220 comprises an outlet end 222, best seen in FIG. 4 and FIG. 8, that is positioned within a portion of the ice bin 73 at a relatively considerable vertical height above the discharge outlet 27 of the system, and further is positioned to at least partially coaxially overlap with a pathway of the discharge chute 25, as explained further below.

In one embodiment, the outlet end 222 of the dispensing tube 220 is positioned at a vertical location above a highest location 281 of the angled wall 280 of the ice bin 73 upon which the auger 74 is aligned, as shown in FIG. 4. In this manner, liquid may exit from the outlet end 222 at a location vertically above the wall location 281 upon which the ice 81 is pushed over by the elevated first end 74*a* of the auger 74. In other words, liquid exits at a height above where the ice 81 begins to fall due to gravity upon actuation of the auger 74.

Advantageously, by positioning the outlet end 222 of the dispensing tube 220 at a relatively high vertical location, the dispensing tube 220 is “out of the way” of the location at which ice falls, and therefore ice 81 is much less likely to catch on an impediment or such as the dispensing tube. In contrast, in prior systems, liquid dispensing tubes placed in communication with the discharge chute 25 or discharge attachment 26, below the point at which ice falls over wall location 281, may create an internal ledge, wall recess, or other non-smooth structure upon which falling ice may catch or clog the system.

As a further advantage, by positioning the outlet end 222 of the dispensing tube 220 at a relatively high vertical location to point vertically downward relative to the discharge chute 25, leak points of the system 10 may be reduced compared to systems in which the dispensing tube arrives at a location immediately adjacent to the discharge outlet 27.

The system has a first length $L_1$ extending between the upper surface of the ice bin 73 to the discharge outlet 27, as measured in FIG. 4. In one embodiment, the dispensing tube 220 extends into the ice bin 73 by a length $L_2$, as measured from the upper surface of the ice bin 73 to the outlet end 222 of the dispensing tube 220. In one example, the outlet end 222 of the dispensing tube 220 is positioned above a halfway point of the first length $L_1$, as depicted in FIG. 4, i.e., the length $L_2$ is less than half of the length $L_1$. In some examples, the length $L_2$ may be in a range between about 2 and about 50 percent of the first length $L_1$, which placement may help ensure the dispensing tube 220 does not vertically interfere with the location 281 at which ice falls.

The ice bin 73 comprises a length $L_3$ in an location 80 between the outlet end 222 of the dispensing tube 220 and the discharge chute 25, as shown in FIG. 4. In this manner, the dispensing tube 220 may be partially or entirely above an area of the ice bin 73 that houses the auger 74, and may be above the highest location 281 of the angled wall 280 of the ice bin 73.

The discharge chute 25 has a length $L_4$ between upper and lower ends 25*a* and 25*b* of the discharge chute 25, as depicted in FIG. 4. The outlet end 222 of the dispensing tube 220 is situated approximately the length $L_3$ above the discharge chute 25.

In some embodiments, an optional discharge attachment 26 having a length $L_5$ may be secured to the discharge chute 25, for example, using a threaded engagement or snap-fit connection between the lower end 25*b* of the discharge chute 25 and an upper end 26*a* of the discharge attachment 26. In such scenario, the discharge outlet 27 of the system 21 is moved from the lower end 25*b* of the discharge chute 25 to the lower end 26*b* of the discharge attachment 26. In this embodiment, the length $L_1$ may be measured as between the upper surface of the ice bin 73 to the discharge outlet 27 when the discharge outlet 27 is at the lower end 26*b* of the discharge attachment 26 (whereas, without the discharge attachment 26, the length $L_1$ may be measured between the upper surface of the ice bin 73 to the lower end 25*b* of the discharge chute 25).

In accordance with another aspect, the outlet end 222 of the dispensing tube 220 is positioned to at least partially coaxially overlap with a pathway of the discharge chute 25. In one embodiment, the discharge chute 25 comprises an interior perimeter 225 having an inner dimension W, as labeled in FIGS. 8-9. When the interior perimeter 225 comprises a circular cross-sectional shape, the inner dimension W is measured as an inner diameter. However, it will be appreciated that the discharge chute 25 may comprise a non-circular cross-section, such as an elliptical or other shape, in which case the inner dimension W may be measured at the smaller point across such perimeter shape. Moreover, in some embodiments, the discharge chute 25 may comprise a tapered shape 83 (depicted in FIG. 3) between the upper and lower ends 25*a* and 25*b* of the discharge chute 25, such that a first inner dimension measured near the upper end 25*a* may be greater than a second inner dimension measured near the lower end 25*b*, in which case the smaller of the inner dimensions may be considered the inner dimension W referenced herein.

Figure 9:
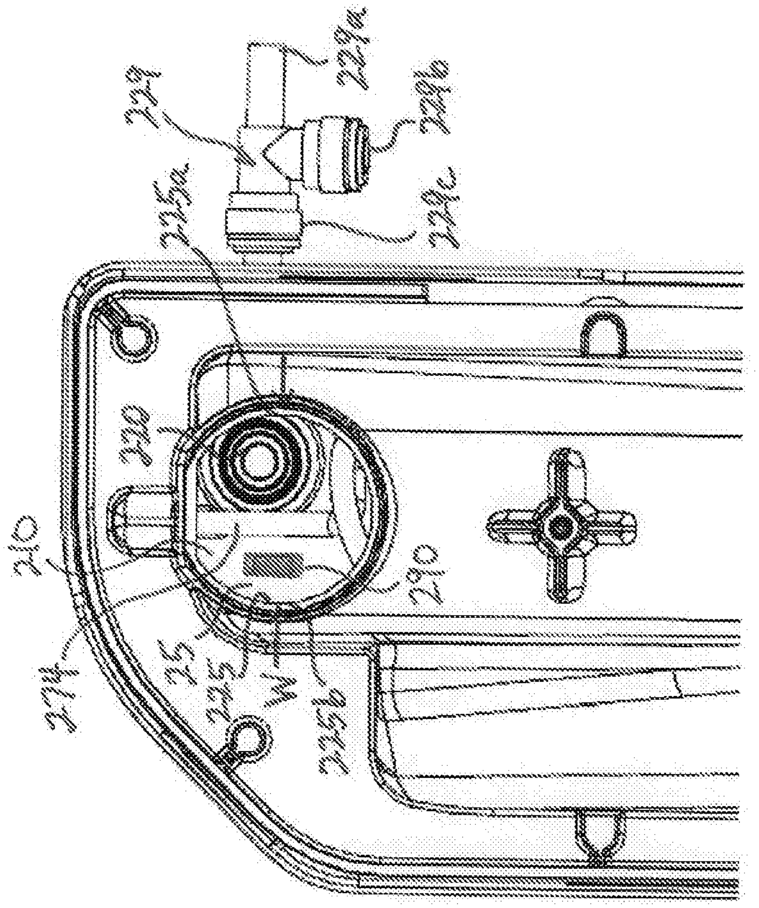
FIG. 9 is a bottom to top view illustrating selected regions of the ice bin and associated components of the system of FIGS. 1-8.

In one embodiment, the outlet end 222 of the dispensing tube 220 is positioned within the inner dimension W of the interior perimeter 225 of the discharge chute 25, such that liquid exiting through the outlet end 222 will be released in a vertically downward direction into the interior perimeter 225 of the discharge chute 25, as seen in FIGS. 4, 8 and 9. The liquid exiting through the outlet end 222 preferably is released at a vertically downward orientation that is within 0 degrees to about 10 degrees relative to the main vertical axis of the discharge chute 25 (which is purely up-and-down within FIG. 4 and FIG. 8).

Advantageously, by having the outlet end 222 of the dispensing tube 220 at least partially coaxially overlap with a pathway of the discharge chute 25, improved pouring of liquid from the dispensing tube 220 may be achieved as liquid may flow from the outlet end 222 substantially directly downward into a user’s cup when placed under the discharge outlet 27. Further, fewer leaks may occur since flow occurs in a generally straight pathway without being redirected at angles relative to the discharge chute 25 or the user's cup.

As yet another advantage, space savings may be achieved with the alignment of the outlet end 222 of the dispensing tube 220 as shown, because a dispensing tube is not required to be connected to a side surface of the discharge chute 25 or the discharge attachment 26, which would add bulk to the system 10 adjacent to those regions.

Figure 10:
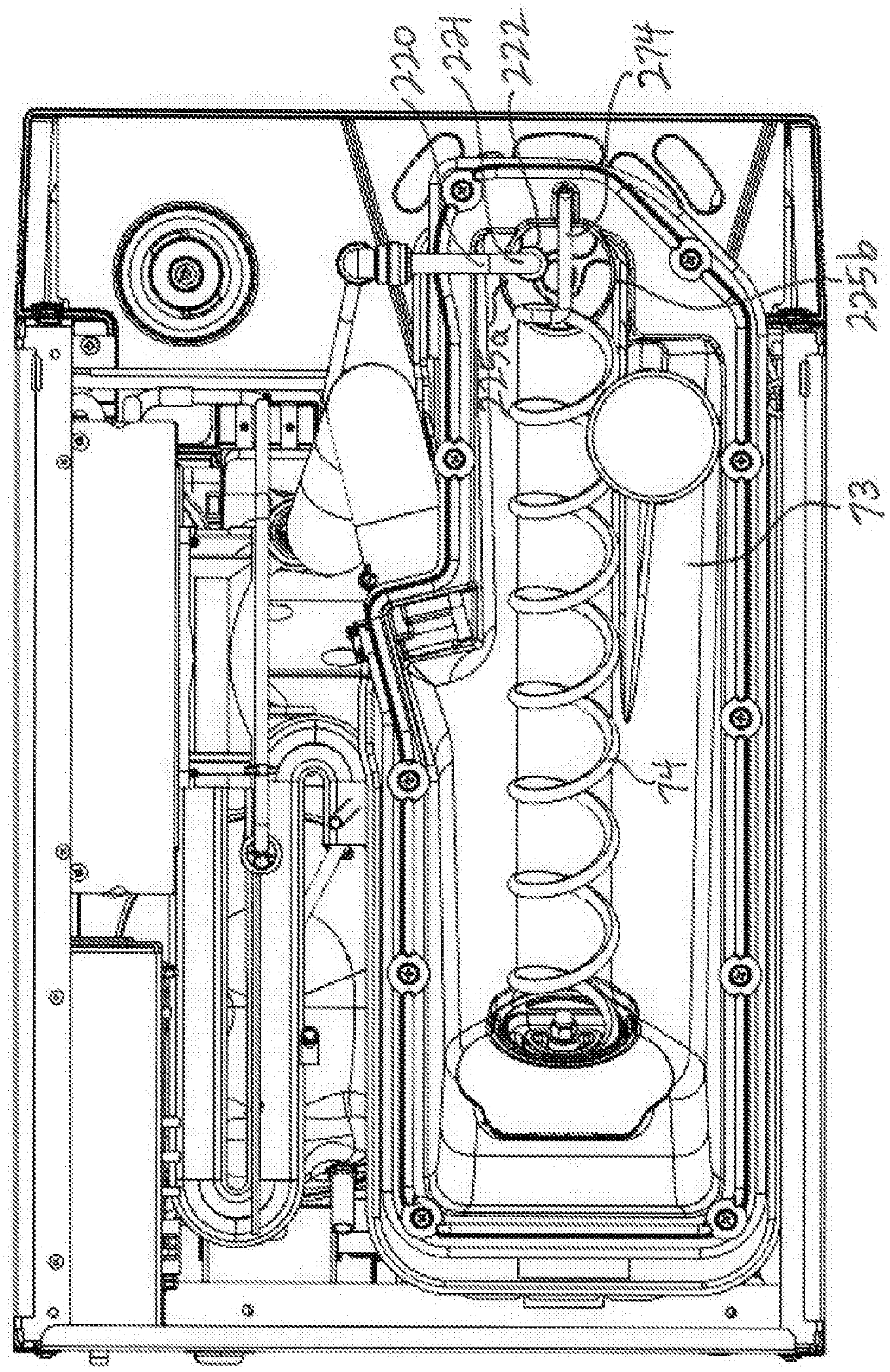
FIG. 10 is a top view depicting features of the ice bin and associated components of the system of FIGS. 1-9 with a lid being removed for illustrative purposes.

Further, the outlet end 222 of the dispensing tube 220 may be positioned within the interior perimeter 225 of the discharge chute 25 at a location offset, in a cross-sectional direction, from the midpoint of the inner dimension W, as seen in FIGS. 4, 8, 9 and 10. In other words, the outlet end 222 of the dispensing tube 220 may be positioned closer to a first segment 225*a* of the interior perimeter 225 than a second segment 225*b* of the interior perimeter 225, as best seen in FIGS. 9-10.

Advantageously, with this positioning, the outlet end 222 of the dispensing tube 220 may avoid crossing paths with a top portion 274 of the auger 74, as best seen in FIGS. 9-10. In one embodiment, the top portion 274 of the auger 74 may be approximately centered between the first and second segments 225*a* and 225*b* of the interior perimeter 225, or the top portion 274 may be positioned closer to the second segment 225*b*, as depicted in FIGS. 9-10. When the outlet end 222 of the dispensing tube 220 is positioned closer to the first segment 225*a*, fluid exiting the outlet end 222 into the interior perimeter 225 will not directly hit the top portion 274 of the auger 74, thus providing a smoother downward flow of liquid around the auger 74.

Advantageously, using the system 10, the user is provided with a common location to place his or her cup or other container, and to fill the container with ice and liquid. The user has the option to fill the cup or other container with ice and liquid at the same time, or independently, depending on instructions provided to the touch screen interface 23 or another suitable actuator (such as one or more buttons). As explained above, such actuator may be coupled to drive the auger 74 to dispense ice, while a valve 29 (see FIG. 3) may be used upstream of the dispensing tube 220 to control the flow of liquid for dispensing into a user's cup via outlet end 222.

In one embodiment, multiple streams of liquid can converge at the dispensing tube 220 with separate valves for control. For example, referring to FIG. 7, a connector 229 suitable for guiding two sources of liquid towards the dispense outlet 27 is shown. The connector 229 has a first inlet port 229*a*, a second inlet port 229*b*, and an outlet port 229*c*. A first liquid, such as drinking water, may be provided to the first inlet port 229*a*, and a solenoid or other valve 29 may be provided upstream of the first inlet port 229*a* and actuated (e.g., via a first instruction to touch screen interface 23) to selectively allow flow of the drinking water into the first inlet port 229*a* and through the outlet port 229*c*, then through the curved segment 221 of the dispensing tube 220 towards a user's cup, as explained above. Similarly, a second liquid (that is different than the first liquid), may be provided to the second inlet port 229*b*, and a solenoid or other valve may be provided upstream of the second inlet port 229*b* and actuated (e.g., via a second instruction to touch screen interface 23) to selectively allow flow of the second liquid into the second inlet port 229*b* and through the outlet port 229*c*, then through the curved segment 221 of the dispensing tube 220 towards a user's cup, as explained above.

The first and second liquids may be selected from a group comprising, by way of example and without limitation, drinking water, heated water (originated from a hot water tank), sparkling water, juices, and other beverages). As will be appreciated, equipment and reservoirs may be located within or coupled to the housing 11 of the system 10 to produce or store such liquids, with the storage reservoirs being selectively placed in communication with the connector 229 by appropriate tubing and actuators, as explained above.

In an alternative embodiment, multiple sources of liquid may be produced or stored in the housing 11 of the system 10, but the connector 229 may be omitted, such that multiple different dispensing tubes 220 may enter into the opening 211 above the discharge outlet 27 (where each tube carries a different liquid). In this example, the multiple dispensing tubes 220 may be organized closely adjacent to one another within the same opening 211 of the housing. Alternatively, multiple different openings 211 may be provided, and one dispensing tube 220 may enter into a particular opening 211, subject to space constraints of the system.

In an alternative embodiment, the dispensing tube 220 may not extend through a top of the lid 202 or the ledge 210 per se, but rather may extend through an opening that is disposed relatively high in a sidewall of the ice bin 73. One non-limiting example of a placement area is location 207 as shown in FIGS. 5-6. In such scenario, the dispense tube 220 may enter through the sidewall of the ice bin 73, and flow may be routed via curved segment 221 towards the discharge outlet 27, while maintaining a vertical placement above the highest location 281 of angled wall 280, and still achieving the fluid discharge advantages outlined above.

With regard to cleaning of the system 10, the placement of the dispensing tube 220 above and at least partially coaxially aligned with the discharge outlet 27 provides increased ease of cleaning and sanitizing operations.

The method of cleaning requires the entire vessel, including the ice storage bin, ice maker water reservoir, ice making evaporator, ice maker head, interconnecting tubes, vent lines, ice transport tube, etc., to be flooded with cleaning, descaling and/or sanitizing solutions and allowed to soak for an amount of time (for brevity and ease of reference, such cleaning, descaling and/or sanitizing solutions may generally be referred to herein as simply "cleaning solutions" or "cleaning or sanitizing solutions"). This chemical solution can be a single solution to perform all functions or separate successive solutions specific to cleaning, descaling, and/or sanitizing. This process can then be followed by one or more rinsing operations where the system is partially or completely flooded with potable water to rinse the residual chemical cleaner/descaler/sanitizer from the interior surfaces of the system.

Referring back to FIG. 3, the cleaning operation is preferably done when the level of water in the water reservoir 53 is substantially empty. Then, the water control valve 91 and/or valve 29 can be shut off, as will the water delivery from line 97 be shut off by closing the valve 98, and a valve for emptying the water reservoir 53 via its discharge line 49 will be closed, after all the water is drained from the closed system. Then, upon removal of the cap 127 covering an opening 128 at the top of the bin 73 (depicted in FIGS. 3, 5 and 6), the cleaning and/or sanitizing solution can be added to the bin 73 via the opening 128, which will fill the bin 73, the drain line 86, the water reservoir 53, the ice making zone 66, the ice conduit 71, and the discharge chute 25 and discharge attachment 26. In one preferred step, the cap 127 may be re-located beneath the discharge outlet 27, for example, as explained in the '950 patent, to prevent leakage of the solution from this region. In this condition, the ice maker, water reservoir, ice storage bin, ice delivery conduit line, melt water drain line, and regions for dispensing liquid (particularly the discharge chute 25 and discharge attachment 26) can now receive the solution and be cleaned and/or sanitized.

Notably, when cleaning and/or sanitizing solution is introduced into the system 10 via the opening 128, such solution may initially directly engage the angled wall 280 of the ice bin 73 and be inclined to flow downward. However, once the ice bin 73 begins to fill up with the solution, flow may be redirected over the wall location 281 and into the discharge chute 25 and discharge attachment 26.

Advantageously, the system 10 allows cleaning, descaling and/or sanitizing of the liquid discharge areas 25 and 26 simultaneously with the cleaning, descaling and/or sanitizing of the ice storage bin, ice making system, and all additional components in the same cleaning procedure. In contrast, in prior systems, a first cleaning or sanitizing operation may have been required to be performed for the ice bin, and a separate cleaning or sanitizing operation may have been performed for the liquid discharge chute and outlet areas. Therefore, use of the present system 10 provides time savings and efficiency compared to prior systems during cleaning and sanitizing operations.

If desired, during the cleaning operation, the motor 62 may be used to drive the auger 60 inside the evaporator, and/or the motor 75 may drive the auger 74 in the ice storage bin 73, to provide some agitation of the cleaning or sanitizing solution within the system.

After a pre-determined cleaning time, the valve in the discharge line 49 from the water reservoir 53 can be opened, and the cleaning solution can be discharged into a drain or container, as may be desired.

As yet a further advantage of the system 10, the dispensing tube 220 that is mounted inside of the ice storage hopper can be utilized to either add water to dilute the cleaning/descaling/sanitizing chemicals and/or flood the system with potable water from the water main's inlet. This not only simplifies the cleaning procedure, it improves the procedure by cleaning/descaling/sanitizing and rinsing the water dispense point outlet at the same time. This process may be controlled through the use of the touch screen user interface 23, which may be used to guide through the cleaning/descaling/sanitizing process steps.

Accordingly, positioning of the dispensing tube 220 eliminates the need to bring water from a secondary source (outside of the ice and water dispenser) for the rinsing of the ice storage bin, ice making water reservoir, and ice making evaporator. In contrast, in prior systems, a secondary water source (not shown) would need to be hooked up to the system 10, requiring additional time, equipment, and water source valving/equipment. In the present embodiments, water from a single source and dispensing tube 220 can be used for drinking water and, without additional equipment, for cleaning operations of the entire system as explained.

Thereafter, the cap 127 can be removed from its position closing off the discharge outlet 27, and returned to close the opening 128 in the bin cover, and various water inlets to the system can be resumed, once the sanitizing, cleaning and/or any desired rinsing of the system has been completed, with the valve 59 thereafter being closed, and operation of the ice and water dispensing system can resume.

Additionally, in one embodiment, the system 10 may comprise at least one antimicrobial treatment device 290, which is depicted in one exemplary placement in FIG. 9 (though omitted from other figures for illustrative purposes). In the non-limiting example of FIG. 9, the antimicrobial treatment device 290 may be secured to an interior region of the ledge 210, such that the antimicrobial treatment device 290 can shine downward to sanitize or treat surfaces throughout the discharge chute 25, the discharge attachment 26 and the discharge outlet 27. In particular, such placement of the antimicrobial treatment device 290 may sanitize or treat the interior perimeter 225 of the discharge chute 25 (including but not limited to the first and second segments **225*a* and 225*b* of the interior perimeter 225, as depicted in FIG. 9). Further, the antimicrobial treatment device 290 may also shine upon and treat portions of the angled wall 280, including its highest location 281 as shown in FIG. 4, and additionally may treat the outlet end 222 of the dispensing tube 220, and areas above the dispensing tube 220 shown in FIG. 4**.

Advantageously, in this manner, the antimicrobial treatment device 290 can provide sanitization of at least the aforementioned surfaces of the system 10, thereby providing ongoing sanitization of surfaces without user intervention. As a further advantage, placement of the antimicrobial treatment device 290 may provide a degree of treatment to the water stream and ice itself.

In one embodiment, the antimicrobial treatment device 290 may comprise one or more antimicrobial lights or other electromagnetic radiation emitter(s). By way of example, and without limitation, such antimicrobial lights or other electromagnetic radiation emitter(s) may include a continuous antimicrobial light embodying aspects of the VS3255 model manufactured by Vyv, Inc. of Troy, NJ, albeit on a reduced scale for use in the system 10, e.g., by providing such antimicrobial light as a single LED on a board secured to the interior region of the ledge 210.

In alternative embodiments, two or more antimicrobial treatment devices 290 may be provided. In either the embodiment with one or multiple antimicrobial treatment devices 290, the placement of devices may be varied to be mounted at other interior regions within or around the discharge chute 25, so long as they are oriented in a direction to sanitize or otherwise treat the aforementioned surfaces of the system 10 (or other desired surfaces).

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A system for dispensing ice and at least one liquid, the system comprising:

an ice bin for storing a quantity of ice particles;

a dispensing tube for carrying at least a first liquid;

a discharge chute in communication with a discharge outlet, wherein the discharge chute is disposed upstream of the discharge outlet;

wherein an outlet end of the dispensing tube is positioned within a portion of the ice bin at a location aligned above the discharge outlet, and wherein the ice particles and the first liquid are dispensed through the discharge outlet separately or at the same time.

2. The system of claim 1, wherein the outlet end of the dispensing tube is positioned above a halfway point of the overall length from the upper surface of the ice bin to the discharge outlet.

3. The system of claim 1, wherein the dispensing tube enters into the ice bin through an upper surface of the ice bin.

4. The system of claim 1, wherein the outlet end of the dispensing tube is positioned laterally within an interior perimeter of the discharge chute.

5. The system of claim 1, further comprising:

an auger for advancing the ice particles towards the discharge chute, wherein the auger is aligned to follow an angled wall of the ice bin, wherein the ice particles are advanced over a highest location of the angled wall until they fall down the discharge chute due to gravity, wherein the outlet end of the dispensing tube is positioned vertically above the highest location of the angled wall.

6. The system of claim 5, wherein the outlet end of the dispensing tube is positioned closer to a first side of an interior perimeter of the discharge chute compared to an opposing second side of the interior perimeter of the discharge chute, such that the first liquid is dispensed radially around a top portion of the auger.

7. The system of claim 1, further comprising a second liquid, wherein the dispensing tube is operative to dispense either the first liquid or the second liquid through the outlet end of the dispensing tube.

8. The system of claim 1, wherein the dispensing tube enters into the ice bin through an opening in a ledge adjacent to an upper region of the ice bin.

9. The system of claim 8, wherein the opening in the ledge transitions into a recess having an upper region having a first width, and a lower region having a second width, where the first width is greater than the second width, and where the dispensing tube comprises a fitting that is secured adjacent to the lower region of the recess.

10. The system of claim 1, wherein the dispensing tube does not extend vertically above an upper surface of a lid of the ice bin.

11. The system of claim 1, wherein the first liquid delivered through the dispensing tube is a potable water, wherein the first liquid is adapted to be delivered through the discharge outlet in a first operative state when a user requests drinking water, and wherein the first liquid is further adapted to be delivered through the dispensing tube into the discharge chute during a cleaning or sanitizing operation.

12. The system of claim 11, wherein the cleaning or sanitizing operation simultaneously cleans at least the discharge chute and the ice bin.

13. A system for dispensing ice and at least one liquid, the system comprising:

an ice bin for storing a quantity of ice particles;

a dispensing tube for carrying at least a first liquid; and a discharge chute in communication with a discharge outlet, wherein the discharge chute is disposed upstream of the discharge outlet;

wherein the dispensing tube is operative to dispense the first liquid through the discharge outlet for drinking by a user in a first operative state, and wherein the dispensing tube is operative to dispense the first liquid into the discharge chute in a second operative state during a cleaning operation, wherein the cleaning operation simultaneously cleans at least the discharge chute and the ice bin, and wherein the ice particles are stored in the ice bin at a location separated from the first liquid.

14. The system of claim 13, wherein the ice particles and the first liquid are dispensed through the discharge outlet separately or at the same time in the first operative state.

15. The system of claim 13, wherein an outlet end of the dispensing tube is positioned within a portion of the ice bin at a location aligned above the discharge outlet in both the first and second operative states.

16. The system of claim 15, further comprising:

an auger for advancing the ice particles towards the discharge chute, wherein the auger is aligned to follow an angled wall of the ice bin, wherein the ice particles are advanced over a highest location of the angled wall until they fall down the discharge chute due to gravity, wherein the outlet end of the dispensing tube is positioned vertically above the highest location of the angled wall.

17. The system of claim 13, further comprising a second liquid, wherein the dispensing tube is operative to dispense the second liquid through the outlet end of the dispensing tube.

* * * * *